US012698587B2

(12) United States Patent  (10) Patent No.: US 12,698,587 B2
Kim et al.  (45) Date of Patent: Aug. 4, 2026

(54) COATED FABRIC AND AIR BAG COMPRISING THE SAME

(71) Applicant: KOLON INDUSTRIES, INC., Seoul (KR)

(72) Inventors: Hyo Eun Kim, Seoul (KR); Il Chung, Seoul (KR); Ki Jeong Kim, Seoul (KR); Jin Wook Heo, Seoul (KR); Ji Hoon Park, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 350 days.

(21) Appl. No.: 18/252,730

(22) PCT Filed: Dec. 23, 2021

(86) PCT No.: PCT/KR2021/019706
§ 371 (c)(1),
(2) Date: May 12, 2023

(87) PCT Pub. No.: WO2022/145873
PCT Pub. Date: Jul. 7, 2022

(65) Prior Publication Data
US 2023/0416976 A1 Dec. 28, 2023

(30) Foreign Application Priority Data

Dec. 29, 2020 (KR) ........................ 10-2020-0186479
Dec. 22, 2021 (KR) ........................ 10-2021-0185280

(51) Int. Cl.
*D06M 11/44* (2006.01)
*B60R 21/235* (2006.01)
*D03D 1/02* (2006.01)
*D03D 13/00* (2006.01)
*D06B 1/02* (2006.01)

*D06C 3/00* (2006.01)
*D06M 11/79* (2006.01)
(Continued)

(52) U.S. Cl.
CPC ........... *D06M 11/44* (2013.01); *B60R 21/235* (2013.01); *D03D 1/02* (2013.01); *D03D 13/008* (2013.01); *D06B 1/02* (2013.01); *D06C 3/00* (2013.01); *D06M 11/79* (2013.01); *D06M 15/564* (2013.01); *D06M 15/643* (2013.01); *B60R 2021/23514* (2013.01); *B60R 2021/23542* (2013.01); *D10B 2505/124* (2013.01); *Y10T 442/20* (2015.04); *Y10T 442/2861* (2015.04)

(58) Field of Classification Search
None
See application file for complete search history.

(56) References Cited

U.S. PATENT DOCUMENTS 5,258,211 A 11/1993 Momii
2002/0032116 A1 3/2002 Jubb

FOREIGN PATENT DOCUMENTS

CN 101336322 B 2/2011
CN 103774445 A 5/2014
CN 205615111 U 10/2016
(Continued)

OTHER PUBLICATIONS

International Search Report Dated Apr. 11, 2022.
The Office Action dated Mar. 4, 2025, of the corresponding Japanese Patent Application.

*Primary Examiner* — Arti Singh-Pandey
(74) *Attorney, Agent, or Firm* — Harvest IP Law, LLP

(57) ABSTRACT

The present application relates to a coated fabric and an air bag comprising the same.

13 Claims, 4 Drawing Sheets

Main panel 5-layer (outside)

Heat shield reinforcement (Inside)

(51) Int. Cl.
   *D06M 15/564*          (2006.01)
   *D06M 15/643*          (2006.01)

(56)          References Cited

FOREIGN PATENT DOCUMENTS

| CN | 108951181 A | 12/2018 |
|----|-------------|---------|
| JP | H02-132705 A | 5/1990 |
| JP | H08-506561 A | 7/1996 |
| JP | H08-224720 A | 9/1996 |
| JP | 2001-018740 A | 1/2001 |
| JP | 2004-162796 A | 6/2004 |
| JP | 2004-270053 A | 9/2004 |
| JP | 2005-105438 A | 4/2005 |
| JP | 2006-321053 A | 11/2006 |
| JP | 2009-120998 A | 6/2009 |
| JP | 2013-170326 A | 9/2013 |
| JP | 2013-243071 A | 12/2013 |
| JP | 2014-514469 A | 6/2014 |
| KR | 10-2009-0083938 A | 8/2009 |
| KR | 10-2010-0012674 A | 2/2010 |
| KR | 10-2017-0023725 A | 3/2017 |
| KR | 10-2017-0038352 A | 4/2017 |
| KR | 10-1908778 B1 | 12/2018 |

【FIG. 1a】
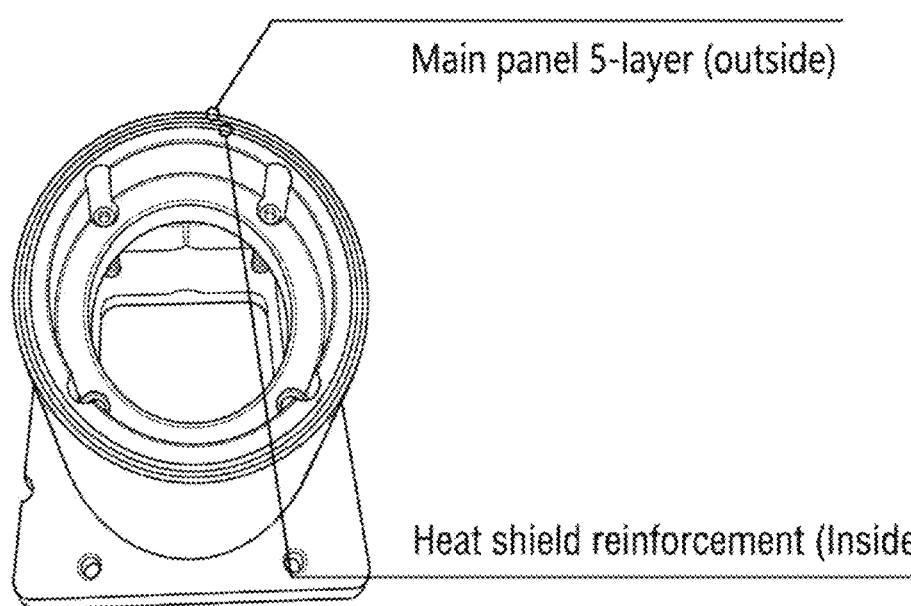
Main panel 5-layer (outside)
Heat shield reinforcement (Inside)
【FIG. 1b】
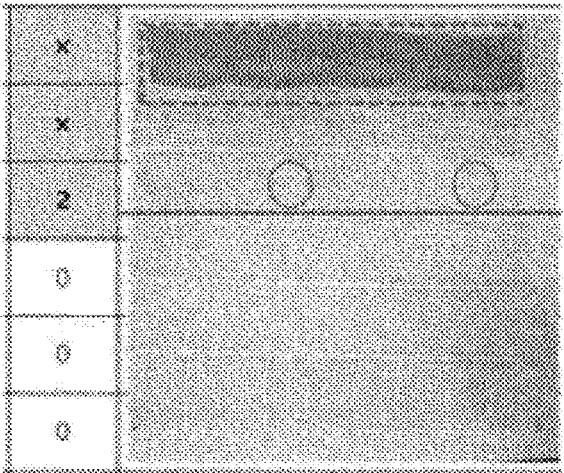

【FIG. 1c】
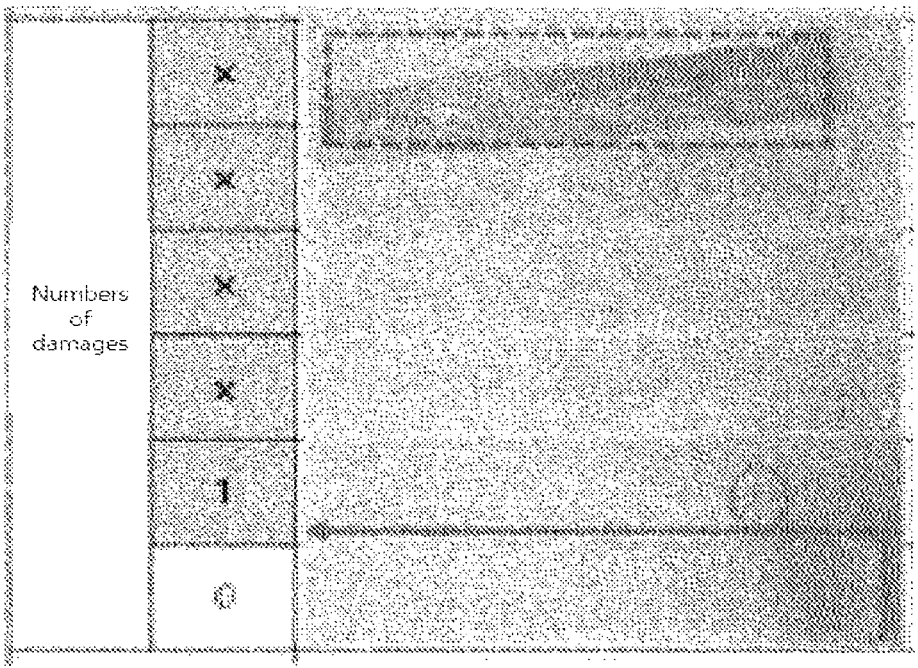
【FIG. 1d】
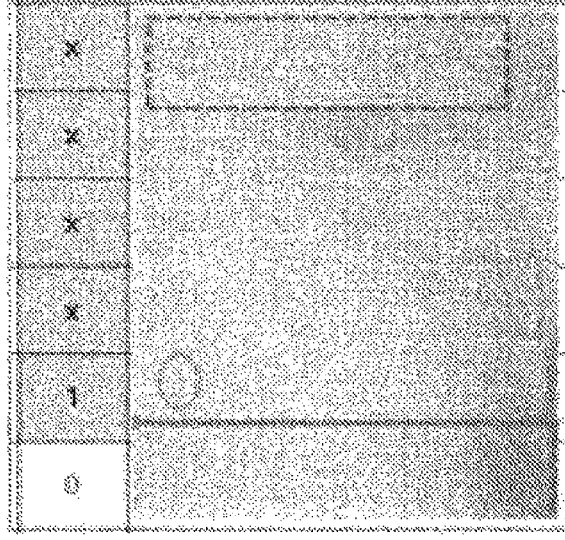

【FIG. 2】
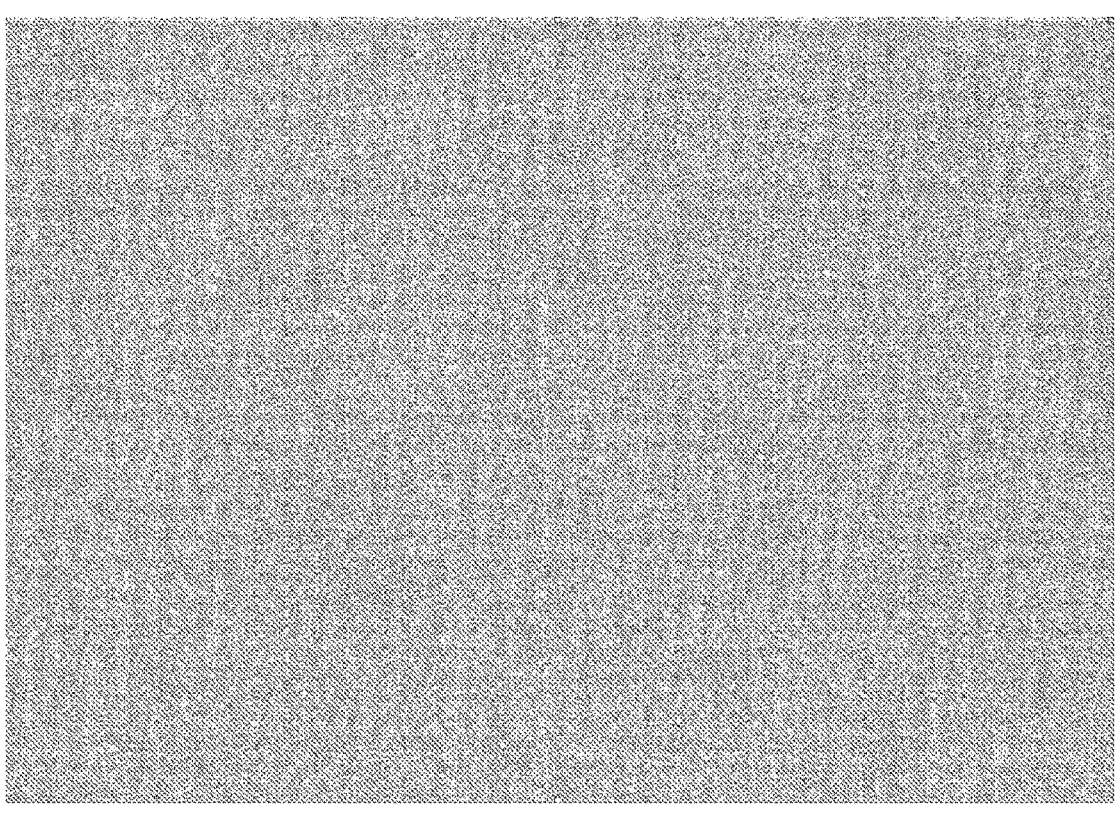

【FIG. 3a】
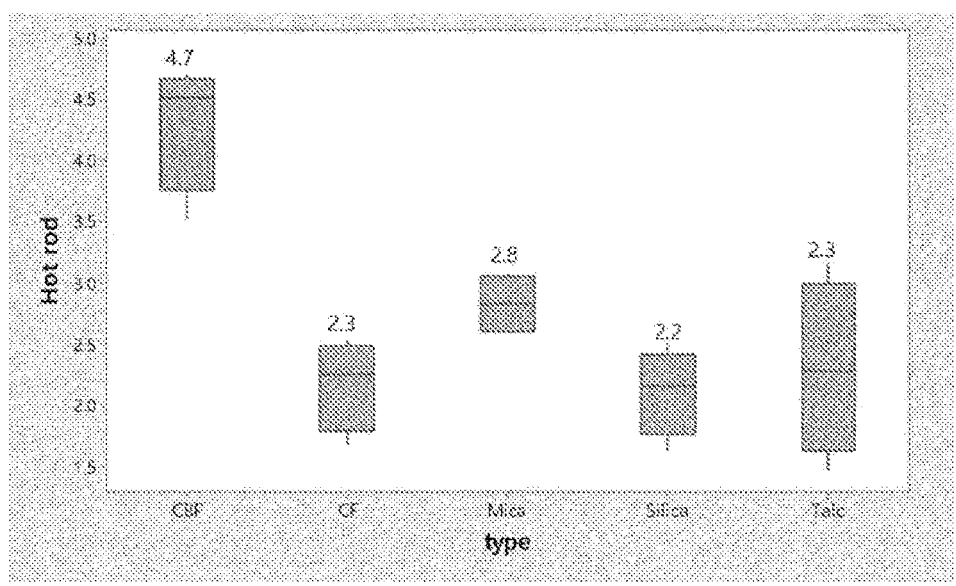
【FIG. 3b】
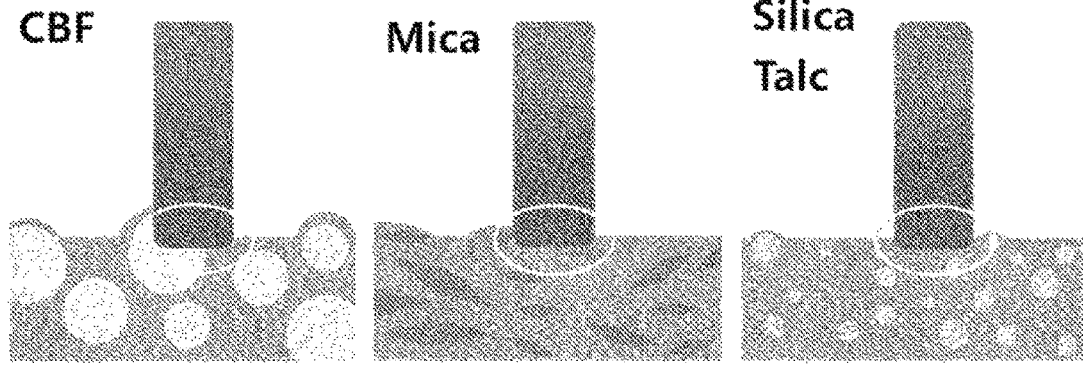

COATED FABRIC AND AIR BAG COMPRISING THE SAME

CROSS-REFERENCE TO RELATED APPLICATION(S)

This application is a National Stage of International Application No. PCT/KR2021/019706 filed on Dec. 23, 2021 claiming the benefit of Korean Patent Application No. 10-2020-0186479 filed on Dec. 29, 2020 and Korean Patent Application No. 10-2021-0185280 filed on Dec. 22, 2021 in the Korean Intellectual Property Office, the disclosures of which are incorporated herein by reference in their entirety.

TECHNICAL FIELD

The present application relates to a coated fabric and an air bag comprising the same.

BACKGROUND ART

Air bag is an apparatus for protecting vehicle users by exploding gunpowder after detecting crash impact with a sensor, and expanding a gas supplied to the inside of an airbag cushion, when an external force due to a collision or the like is applied to the vehicle. Because high-temperature and high-pressure gas is generated around the inflator involved in the cushion expansion process, the airbag fabric is damaged, which causes a decrease in the pressure resistance performance of the cushion.

In order to prevent such a phenomenon, conventionally, it was considered to use a high-density woven fabric or increase the coating weight, but this does not match the tendency of the airbag cushion to be smaller and lighter, and has a problem of deteriorating storability (foldability).

DETAILED DESCRIPTION OF THE INVENTION

Technical Problem

It is one object of the present application to provide a coated fabric capable of solving the above-mentioned problems caused by conventional technologies.

It is another object of the present application to provide a coated fabric having excellent foldability.

It is another object of the present application to provide a coated fabric having excellent heat resistance and durability even at low weight and/or low density.

It is yet another object of the present application to provide an air bag comprising the coated fabric.

The above and other objects of the present application can be completely achieved by the present application described below.

Technical Solution

In one embodiment, the present disclosure relates to a coated fabric. Specifically, the coated fabric comprises a fibrous substrate (A), and a coating layer (B) formed on the fibrous substrate.

In regard to the joining relationship between the fibrous substrate (A) and the coating layer (B) constituting the coated fabric, the "coating layer is formed on the fibrous substrate" as used herein means that a film (coating layer) is formed on the surface of the fibrous substrate (and/or the fiber forming the fibrous substrate) by the coating layer-forming material.

According to an embodiment of the present application, the coating layer (B) includes a binder resin and a filler, wherein the filler is present in a dispersed state in the coating layer or in the binder resin. At this time, the filler may include chopped ceramic fibers and/or agglomerates thereof. Specifically, the filler may be CBF (ceramic bulk fiber) in an agglomerated state (namely agglomerated CBF).

In one embodiment, the fibrous substrate may include non-ceramic fibers. For example, the fibrous substrate may include organic fibers. When the fibrous substrate includes ceramic fibers, the characteristics such as tensile strength, tear strength and elongation, which are basically required for airbag fabric, are not good.

The type of the organic fiber contained in a fibrous substrate is not particularly limited. For example, the fibrous substrate may include at least one selected among a polyester fiber, an aramid fiber, a nylon fiber, a carbon fiber, a polyketone fiber, a cellulose fiber, a polyolefin fiber, and an acrylic fiber.

In one embodiment, the fiber contained in the fibrous substrate may have a fineness in the range of 450 to 1,100 dtex. Specifically, the lower limit of the fineness may be, for example, 500 dtex or more, 550 dtex or more, or 600 dtex or more, and the upper limit thereof may be, for example, 1000 dtex or less, 900 dtex or less, 800 dtex or less, 700 dtex or less, or 600 dtex or less. When the fineness of the fiber used satisfies the above range, it is advantageous to secure an appropriate level of lightweight property and mechanical property.

In one embodiment, the fibrous substrate may be a woven fabric or a non-woven fabric, or may include one or more of them.

In one embodiment, the fibrous substrate may include one or more layers. For example, the fibrous substrate may be a laminate including two or more (woven) fabric layers, a laminate including two or more nonwoven layers, or a laminate including one or more (woven) fabric layers and one or more nonwoven layers.

The fibrous substrate may have a low density characteristic in order to secure the foldability of the (coated) fabric for airbag.

In one embodiment, the fibrous substrate may be a fabric containing warp and weft threads, and the warp and weft densities of the fabric may be in the range of 20 to 55 th/inch, respectively. Specifically, the lower limit of the density of the warp or weft threads may be, for example, 25 th/inch or more, 30 th/inch or more, 35 th/inch or more, 40 th/inch or more, or 45 th/inch or more, and the upper limit thereof may be, for example, 50 th/inch or less or 45 th/inch or less. The density can be measured according to ISO 7211-2 (Section 3.07), but is not particularly limited thereto.

In the case of a conventional technology, in order to secure the airtightness of the fabric and prevent damage (or breakage) at the time of airbag inflation, it was considered to use a fibrous substrate woven at a high density (e.g., 70 th/inch) in at least one of the warp and weft threads. However, the use of the high-density fabric as described above not only hinders the weight reduction of the airbag, but also has poor foldability and storability of the airbag. In the present application, since the low-density fabric as described above is used, the fabrics and airbags can be made lightweight, and it is advantageous in securing the foldability and storability of the airbag. In particular, since the coated fabric of the present application has a coating layer described below, it is also excellent in heat resistance and durability.

The coating layer of the coated fabric according to the present application includes a ceramic fiber as a filler as described above. Since the ceramic fiber is a short fiber and has the tendency to agglomerate with each other in the coating layer or in the composition for forming the coating layer, it can provide sufficient heat resistance and durability than other types of fillers. The ceramic fiber (e.g., ceramic bulk fiber (CBF)) used herein has a stronger tendency to agglomerate. Therefore, the ceramic fiber used herein can provide superior heat resistance compared to a ceramic filler of the same size, that is, a conventional ceramic filler that is not in the form of a fiber (see Evaluation 2 below).

For example, in the embodiment of the present application, the ceramic fiber has a shape (bulk shape) in which chopped short fibers are bundled or agglomerated. In the coating layer, the fiber forms a plurality of agglomerates, and these agglomerates are dispersedly present in the coating layer or in the binder resin.

As confirmed in the Experimental Example below, Example using the coating layer in which the agglomerates of chopped ceramic fibers are dispersedly present, can have more excellent heat resistance and durability than Comparative Example 1 using a large amount of coating and Comparative Example 2 using a two-layer fabric.

In one embodiment, the ceramic fiber, that is, the ceramic bulk fiber (CBF) may have a size in the range of 0.1 to 2.0 mm. At this time, the size of the CBF can be confirmed through a known optical microscope or the like, and may mean the length of the largest dimension among the dimensions of the shape of the CBF.

Specifically, the size of the CBF (ceramic bulk fiber) may be, for example, 0.15 mm or more, 0.20 mm or more, 0.25 mm or more, 0.30 mm or more, 0.35 mm or more, 0.40 mm or more, 0.45 mm or more, 0.50 mm or more, 0.55 mm or more, 0.60 mm or more, 0.65 mm or more, 0.70 mm or more, 0.75 mm or more, 0.80 mm or more, 0.85 mm or more, 0.90 mm or more, 0.95 mm or more, 1.0 mm or more, 1.05 mm or more, 1.10 mm or more, 1.15 mm or more, 1.20 mm or more, 1.25 mm or more, 1.30 mm or more, 1.35 mm or more, 1.40 mm or more, 1.45 mm or more, or 1.50 mm or more. And, the upper limit of the size of the ceramic bulk fiber (CBF) may be, for example, 1.95 mm or less, 1.90 mm or less, 1.85 mm or less, 1.80 mm or less, 1.75 mm or less, 1.70 mm or less, 1.65 mm or less, 1.60 mm or less, 1.55 mm or less, 1.50 mm or less, 1.45 mm or less, 1.40 mm or less, 1.35 mm or less, 1.30 mm or less, 1.25 mm or less, 1.20 mm or less, 1.15 mm or less, 1.10 mm or less, 1.05 mm or less, 1.0 mm or less, mm or less, 0.90 mm or less, 0.85 mm or less, 0.80 mm or less, 0.75 mm or less, 0.70 mm or less, 0.65 mm or less, 0.60 mm or less or 0.55 mm or less. The CBF agglomerated to have the above range can provide excellent heat resistance and durability.

In the embodiment according to the present application, the degree of dispersion of the agglomerates can be expressed by the area occupied by the agglomerates visually recognized in the coating layer relative to the area of the coating layer. For example, the agglomerates may occupy an area ranging from 1 to 25% of the total area of the coating layer. This area can be calculated by analyzing the surface of the coating layer with an optical microscope. Specifically, the degree of dispersion of the filler can be confirmed by a method of confirming the total area of one surface of the coating layer, confirming the area occupied by the filler (agglomerate) on one surface of the coating layer, and then calculating what percentage of the area of the coating layer the filler (agglomerate) occupies. At this time, the coating layer may be divided into a plurality of regions, and the area measured for each divided regions and its ratio may be calculated as an average value (arithmetic mean). The type of the optical microscope used in this regard is not particularly limited. Specifically, the ratio of the area occupied by the agglomerate to the total area of the coating layer may be, for example, 5% or more or 10% or more, and the upper limit thereof may be, for example, 20% or less or 15% or less.

In one embodiment, the ceramic fiber may include oxides, nitrides, or carbides of at least one selected among Si, Al, Ti, Zr, Ca, and Mg.

In one embodiment, the ceramic fiber may include an oxide of at least one selected among Si, Al, Ti, Zr, Ca, and Mg.

In one embodiment, the ceramic fiber may include $SiO_2$, CaO, and MgO. When the ceramic fiber included in the coating layer include at least $SiO_2$, CaO and MgO, excellent heat resistance and durability can be secured as confirmed in Experimental Example below.

In one embodiment, the ceramic fiber may contain 50 to 60% by weight of $SiO_2$, 20 to 30% by weight of CaO, and 10 to 30% by weight of MgO. When the ceramic fiber contained in the coating layer contains $SiO_2$, CaO and MgO in the above content range, excellent heat resistance and durability can be secured as confirmed in Experimental Example below.

In one embodiment, the coating amount of the coating layer for one layer of the fibrous substrate may be 100 gsm $(g/m^2)$ or less. Specifically, the lower limit of the coating amount may be, for example, 50 gsm or more, 55 gsm or more, 60 gsm or more, 65 gsm or more, 70 gsm or more, 75 gsm or more, 80 gsm or more, 85 gsm or more, 90 gsm or more, or 95 gsm or more. And, the upper limit may be, for example, 95 gsm or less, 90 gsm or less, 85 gsm or less, 80 gsm or less, 75 gsm or less, 70 gsm or less, 65 gsm or less, or 60 gsm or less. Generally, it is expected that as the coating amount increases, the effect due to the coating increases. However, since the coating layer of the present application is a coating layer in which a ceramic fiber filler is dispersed, even when the coating amount is small, a higher coating effect (e.g., heat resistance and durability) can be secured than when ceramic fiber fillers are not used or when other types of fillers are used. The coating amount may be measured according to ISO 3801 (Section 3.07), but is not particularly limited thereto.

In one embodiment, the binder resin contained in the coating layer may include at least one selected among a silicone resin and a urethane resin. Specific components and properties of the silicone resin or the urethane resin are not particularly limited.

According to an embodiment of the present application, a silicone resin may be used as the binder resin. In this case, the specific type of the material capable of forming the silicone binder resin is not particularly limited. For example, the silicone resin may be or may include a silicone elastomer formed by crosslinking or curing polysiloxane. And, a siloxane compound known to be able to provide a silicone resin by polyaddition reaction can also be used as the silicone binder resin. In addition, known products, for example, TCS 7516 or TCS 7537 by Elkem Silicones can also be used for forming the coating layer including the silicone binder resin.

In one embodiment, the coating layer may include the filler in an amount of 20% by weight or less, based on 100% by weight of the total coating layer. At this time, 100% by weight of the entire coating layer may mean a total content based on the solid content of the binder resin and filler contained in the coating layer. Alternatively, the total content based on the solid content of the binder resin, the filler, and other components (e.g., additives) can be seen as 100% by weight of the entire coating layer. When the content of the filler exceeds the above range, the viscosity of the coating solution increases and so the dispersion is not uniform, and the effect due to the formation of the coating layer cannot be sufficiently obtained. The lower limit of the content of the filler is not particularly limited, and for example, it may be 1% by weight or more. Specifically, when considering the effect of improving heat resistance and durability due to the use of fillers, it is preferable that at least 5% by weight of the filler is used.

In one embodiment, the weight ($g/m^2$) of the coated fabric having the above configuration may be 350 $g/m^2$ or less. Specifically, the upper limit of the weight of the coated fabric may be, for example, 340 $g/m^2$ or less, 330 $g/m^2$ or less, 320 $g/m^2$ or less, 310 $g/m^2$ or less, or 300 $g/m^2$ or less, and the lower limit thereof may be, for example, 280 $g/m^2$ or more, 290 $g/m^2$ or more, 300 $g/m^2$ or more, or 310 $g/m^2$ or more. When the weight of the coated fabric exceeds the above upper limit, it is difficult to reduce the weight, and the fabric preparing costs may increase. Further, when the weight of the coated fabric is less than the above lower limit, the mechanical properties may be reduced. The weight of the coated fabric can be measured according to ISO 3801 (Section 3.07), but is not particularly limited thereto.

In one embodiment, the thickness of the coated fabric having the above configuration may be in the range of 0.25 to 0.40 mm. At this time, the thickness of the fabric is based on one layer of the coated fabric. Specifically, the lower limit of the thickness may be 0.26 mm or more, 0.27 mm or more, 0.28 mm or more, 0.29 mm or more, or 0.30 mm or more, and the upper limit thereof may be, for example, 0.39 mm or less, 0.38 mm or less, 0.37 mm or less, 0.36 mm or less, 0.35 mm or less. When the thickness is less than the lower limit of the above range, it is difficult to secure sufficient mechanical properties, and when the thickness exceeds the above range, foldability is not good. The thickness can be measured according to ISO 5084 (Section 3.09), but is not particularly limited thereto.

In another embodiment according to the present application, there is provided a method of preparing a coated fabric.

Specifically, the method for preparing the coated fabric includes coating a composition including a binder resin and a filler onto a fiber substrate, and then curing the coated composition.

In this case, the filler includes chopped ceramic fibers or agglomerates thereof. In addition, the details concerning the binder resin and filler are the same as described above, and thus will be omitted.

Coating may be performed so that a film (coating layer) of the composition can be formed on the surface of the fibrous substrate (and/or the fiber forming the fibrous substrate). In this regard, the method for coating the composition onto the fibrous substrate is not particularly limited, and may be appropriately performed according to a known method.

In one embodiment, curing may be performed at room temperature or higher. The room temperature is a temperature in a state where temperature increase or temperature decrease is not particularly performed, and mean a temperature of about 15 to 35° C. Further, the temperature greater than or equal to the room temperature is a temperature at which temperature increase is performed, and may mean a temperature exceeding 35° C., for example, a temperature in the range of 40 to 300° C. The curing time at the temperature is not particularly limited, and the curing may be performed, for example, for several seconds (sec) to several tens of minutes (min).

In yet another embodiment according to the present application, there is provided an airbag. The airbag includes the above-described coated fabric.

The details concerning the configuration and characteristics of the coating fabric included in the airbag is the same as described above, and thus the description thereof will be omitted.

In one embodiment, the coated fabric may be used as a reinforcement fabric for an airbag. At this time, the reinforcement fabric means a configuration that is padded to prevent damage to the airbag cushion fabric in the inflation part of the airbag and the like. In this regard, a configuration in which the reinforcement fabric is padded among the configurations of the airbag can be referred to as a main panel. Therefore, the airbag is configured to include a main panel; and a reinforcement fabric attached to at least a partial area of the main panel.

In one embodiment, the main panel may have an area greater than or equal to the area of the reinforcement fabric.

In one embodiment, the main panel may include a fabric including at least one selected among a polyester fiber, an aramid fiber, a nylon fiber, a carbon fiber, a polyketone fiber, a cellulose fiber, a polyolefin fiber, and an acrylic fiber.

In one embodiment, the main panel may include a fabric having a density ranging from 45 to 55 th/inch in warp and weft threads.

In one embodiment, the main panel may have a coating layer. The coating layer of the main panel may include a generally known silicone resin or urethane resin, but is not limited thereto. When the coating is performed, the coating amount may be 20 to 40 gsm, but is not particularly limited thereto.

Advantageous Effects

According to the present application, even when a low-density coating layer is formed on the low-weight fabric in consideration of the weight reduction of airbags and coated fabrics, and the foldability and storability of airbag cushions, the coated fabric for an airbag having excellent heat resistance and durability can be provided.

BRIEF DESCRIPTION OF THE DRAWING

FIG. 1 schematically shows an inflator damage evaluation method and its results. Specifically, FIG. 1a is an image for schematically showing the method of installing the inflator and fabric used for the evaluation, and FIGS. 1b, 1c and 1d are images obtained by photographing the heat resistance evaluation results of Example 1, Comparative Example 1, and Comparative Example 2, respectively.

FIG. 2 is an image of the surface of the coating layer according to an embodiment of the present application taken with an optical microscope. It can be confirmed that the agglomerated form of the filler is visually recognized in a darker shade. The size of the filler confirmed in FIG. 2 is in the range of 0.1 to 2.0 mm.

FIG. 3 is a view showing a comparison of heat resistance and durability evaluation results (hot-rod evaluation) and agglomeration characteristics according to the type of filler. Specifically, FIG. 3a is an experimental result showing that the CBF (ceramic bulk fiber) provides better heat resistance and durability through hot-rod evaluation. Further, FIG. 3b is a schematic diagram for explaining the reason why heat resistance and durability differ depending on the type of filler and the agglomeration characteristics. As shown in FIG. 3b, since the CBF has a stronger tendency to agglomerate compared to other ceramic fillers, damage to the coating layer forming resin can be suppressed under high temperature/high pressure conditions.

DETAILED DESCRIPTION OF THE EMBODIMENTS

Hereinafter, the action and effect of the invention will be described in more detail with reference to specific examples of the invention. However, these examples are presented for illustrative purposes only and the scope of the invention is not limited thereby in any way.

EXAMPLE AND COMPARATIVE EXAMPLE

Example 1

Preparation of coating composition: A composition containing TCS 7516 by Elkem Silicones which is a silicone-based binder resin, and a ceramic bulk fiber (ceramic fiber composed of $SiO_2$ 55 wt. %, CaO 25 wt. %, and MgO 20 wt. %) was prepared. At this time, the content of the ceramic bulk fiber was adjusted to be about 10 wt. % in the final cured coating layer.

Preparation of coated fabric: A fabric was prepared from a PET fiber having a fineness of 550 dtex. Specifically, a fabric (1 layer) having a fabric density of 46×46 th/inch (warp×weft) was prepared, and the prepared composition was coated onto the fabric at a level of about 87 gsm. Then, curing was carried out at a temperature of 160 to 190° C. for at least 1 minute 30 seconds using a hot air chamber, and a woven fabric was prepared. The weight of the prepared coated fabric was 315 g/m², and the thickness was about 0.33 mm (see FIG. 2).

Comparative Example 1

Preparation of coating composition: TCS 7517 by Elkem Silicones was prepared as a silicone-based binder resin.

Preparation of coated fabric: A fabric was prepared from a PA66 fiber having a fineness of 470 dtex. Specifically, a fabric (1 layer) having a fabric density of 46×46 th/inch (warp×weft) was prepared. Then, the prepared coating composition was coated onto the prepared fabric at a level of about 122 gsm (the coating amount was about 50 gsm more than in Example 1), and then cured under the same conditions as in Example 1. The weight of the prepared coated fabric was 308 g/m² and the thickness was about 0.33 mm.

Comparative Example 2

Preparation of coating composition: DC3730 by Dow Corning which is a urethane-based binder resin was prepared.

Preparation of coated fabric: A fabric was prepared from a PA66 fiber having a fineness of 470 dtex. Specifically, a fabric having a fabric density of 112×96 th/inch (warp×weft) was prepared (binded 2 layers. Unlike Example and Comparative Example 1, a two-layer fabric was used). Then, the prepared composition was coated onto the fabric at a level of about 69 gsm. The weight of the prepared coated fabric was 512 g/m² and the thickness was about 0.66 mm.

Evaluation 1: Evaluation of Heat Resistance Durability of Coated Fabrics

The heat resistance of the coated fabrics prepared in Examples and Comparative Examples was evaluated by the following method.

1. HOT-ROD Evaluation

Specifically, a columnar rod (10 mm in diameter, 80 mm in length, and 50 g in weight) was prepared, and the rod was heated to the desired 600° C. and brough into contact with the coated fabric. Then, the time (in seconds) until the rod completely melts the fabric and then falls down was measured, and the results are shown in Table 1 below.

2. Inflator Damage Evaluation

The heat shield fabric was wrapped as a single layer inside the jig of dual inflator for DAB (KSS), and the coated fabrics of Examples and Comparative Examples were wrapped as 6 layers to prepare a specimen (see FIG. 1a). Then, the process of deploying the airbag was simulated so that high-temperature and high-pressure gas was applied to the specimen. At this time, the high temperature and high pressure gas was controlled to be applied at a maximum pressure of 180 to 270 Kpa for 40 to 80 ms.

Then, the number (n) of damaged fabrics and the number (m) of holes found in these damaged fabrics among the five-ply coated fabrics were measured, and the weighted value of n was set to 10 and the weighted value of m was set to 1, and the evaluation results were digitized as follows. As the damage score is lower, the heat resistance is better.

$$\text{Damage score} = (n \times 10) + (m \times n \times 1)$$

TABLE 1

| | | Example 1 | Comparative Example 1 | Comparative Example 2 |
|---|---|---|---|---|
| HOT-ROD evaluation (sec) | | 5.3 | 4.1 | 3.6 |
| Inflator damage evaluation | Number of damaged fabric (layer) | 2 | 4 | 4 |
| | Score | 24 | 44 | 44 |

Evaluation 2: Comparison of Heat Resistance and Durability by Filler

The filler type of the coated fabric prepared in Example 1 was changed as shown in FIG. 3a, and the above-mentioned HOT-ROD evaluation results were compared. Specifically, the content of the filler in the coating layer was equally applied at 5 wt. %, and HOT-ROD evaluation was conducted for the case of using CBF (ceramic bulk fiber), conventional ceramic filler (Mica (D50 number distribution size of about 40 um), Silica (D50 number distribution size of about 20-30 um), Talc (D50 number distribution size of about 20-30 um) and CF (carbon fiber) filler (about 2-3 mm in size). The Y-axis result is the arithmetic mean value (unit: seconds) after the evaluation progresses about 10 times.

The invention claimed is:

1. A coated fabric comprising: a fibrous substrate (A), and a coating layer (B) formed on the fibrous substrate,
   wherein the coating layer comprises a binder resin and a filler, wherein the filler is dispersed in the coating layer, wherein the filler comprises agglomerates of chopped ceramic fibers having a size in the range of 0.1 to 2.0 mm, wherein a coating amount of the coating layer to one layer of the fibrous substrate is 50 gsm to 100 gsm, and wherein the coated fabric has a weight of 280 $g/m^2$ to 350 $g/m^2$.

2. The coated fabric according to claim 1, wherein:

the ceramic fiber comprises oxides, nitrides or carbides of at least one selected among Si, Al, Ti, Zr, Ca and Mg.

3. The coated fabric according to claim 2, wherein:

the ceramic fiber comprises oxides of at least one selected among Si, Al, Ti, Zr, Ca and Mg.

4. The coated fabric according to claim 3, wherein:

the ceramic fiber comprises $SiO_2$, CaO and MgO.

5. The coated fabric according to claim 4, wherein:

the ceramic fiber contains 50 to 60% by weight of $SiO_2$, 20 to 30% by weight of CaO, and 10 to 30% by weight of MgO.

6. The coated fabric according to claim 1, wherein:

the binder resin comprises at least one selected among a urethane resin and a silicone resin.

7. The coated fabric according to claim 1, wherein:

the coating layer contains the filler in an amount of 20% by weight or less, based on 100% by weight of the entire coating layer.

8. The coated fabric according to claim 1, wherein:

the fibrous substrate comprises at least one selected among a polyester fiber, an aramid fiber, a nylon fiber, a carbon fiber, a polyketone fiber, a cellulose fiber, a polyolefin fiber, and an acrylic fiber.

9. The coated fabric according to claim 8, wherein:

the fiber contained in the fibrous substrate has a fineness in the range of 450 to 1,100 dtex.

10. The coated fabric according to claim 8, wherein:

the fibrous substrate is a fabric comprising warp and weft threads, and the warp and weft densities of the fabric are within the range of 20 to 55 th/inch, respectively.

11. The coated fabric according to claim 1, wherein:

the coated fabric has a thickness of 0.25 to 0.40 mm.

12. A method for preparing a coated fabric comprising:

coating a coating composition comprising a binder resin and a filler onto a fibrous substrate and then curing the coated composition to form a coating layer, wherein the filler comprises agglomerates of chopped ceramic fibers having a size in the range of 0.1 to 2.0 mm, wherein a coating amount of the coating layer to one layer of the fibrous substrate is 50 gsm to 100 gsm, and wherein the coated fabric has a weight of 280 $g/m^2$ to 350 $g/m^2$.

13. An air bag comprising the coated fabric according to claim 1.

* * * * *